United States Patent
Hecht et al.

(10) Patent No.: US 12,437,274 B2
(45) Date of Patent: *Oct. 7, 2025

(54) MULTI-CAPTURE FOR REMOTE DEPOSIT VIA SCANNER

(71) Applicant: Wells Fargo Bank, N.A., San Francisco, CA (US)

(72) Inventors: Alan W. Hecht, San Francisco, CA (US); Frank Henry Filippini, Palm Desert, CA (US); Matthew Evan Greber, Corte Madera, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,174

(22) Filed: May 16, 2023

(65) Prior Publication Data

US 2024/0386397 A1 Nov. 21, 2024

(51) Int. Cl.
| | |
|---|---|
| G06Q 20/04 | (2012.01) |
| G06T 7/00 | (2017.01) |
| G06T 7/60 | (2017.01) |
| G06T 7/62 | (2017.01) |
| G06T 7/70 | (2017.01) |
| G06V 10/44 | (2022.01) |

(52) U.S. Cl.
CPC ......... *G06Q 20/042* (2013.01); *G06T 7/0002* (2013.01); *G06T 7/60* (2013.01); *G06T 7/62* (2017.01); *G06T 7/70* (2017.01); *G06V 10/44* (2022.01); *G06T 2207/30168* (2013.01)

(58) Field of Classification Search
None
See application file for complete search history.

(56) References Cited

U.S. PATENT DOCUMENTS

| | | | |
|---|---|---|---|
| 6,695,427 B2 | 2/2004 | Murata et al. | |
| 7,010,155 B2 | 3/2006 | Koakutsu et al. | |
| 7,219,831 B2 | 5/2007 | Murata | |
| 7,747,061 B2 | 6/2010 | Wang et al. | |
| 7,974,921 B1 | 7/2011 | Al Amri | |
| 8,406,500 B2 | 3/2013 | Najari et al. | |
| 8,688,579 B1 * | 4/2014 | Ethington | G06T 7/12 705/42 |
| 12,229,738 B1 * | 2/2025 | Fietsam | G06Q 30/0185 |
| 2003/0126081 A1 | 7/2003 | Ono | |
| 2005/0097046 A1 | 5/2005 | Singfield | |
| 2009/0214085 A1 * | 8/2009 | Bickell | G06V 10/993 382/112 |

(Continued)

Primary Examiner — Suezu Ellis
(74) Attorney, Agent, or Firm — SCHWEGMAN LUNDBERG & WOESSNER, P.A.

(57) ABSTRACT

Systems and techniques may be used to perform multi-capture for remote deposit via scanner. For example, a technique may include scanning a first side and a second side of a plurality of checks, and comparing geometrical features of the first side of each check of the plurality of checks to geometrical features of the second side of each check of the plurality of checks. Based on the comparison, the technique may include selecting an image from a first set of respective individual images that corresponds to an image from a second set of respective individual images to form a pair of images, the pair of images representing a single check of the plurality of checks, and outputting the pair of images.

22 Claims, 10 Drawing Sheets

(56) References Cited

U.S. PATENT DOCUMENTS

| | | |
|---|---|---|
| 2012/0323782 A1 | 12/2012 | Davis et al. |
| 2022/0253840 A1 | 8/2022 | Kolchin |
| 2024/0046242 A1* | 2/2024 | Vudathu ................. G06Q 40/02 |
| 2024/0331028 A1* | 10/2024 | Kobuchi ................. G06Q 40/02 |

* cited by examiner

502

DATE
_____

TWO HUNDRED AND ----------------00/100       $200.00
_____

⑇ 1234567890  ⑇  123798765432 ⑊ 0031

504

DATE
_____

FIFTEEN DOLLARS AND ----------------30/100       $15.30
_____

⑇ 1234567890  ⑇  123798765432 ⑊ 0032

506

DATE
_____

EIGHTY FIVE DOLLARS AND       00/100       $85.00
_____

MULTI-CAPTURE FOR REMOTE DEPOSIT VIA SCANNER

BACKGROUND

Remote deposit capture (RDC), also called mobile check deposit when done with a mobile device, is a technology for processing physical checks at a device not located in a bank or other traditional check cashing location. RDC is used for capturing a check, for example at a user device such as a computer, a mobile device (e.g., a cell phone or tablet), or the like. The captured check may be processed locally at the user device or sent to a different device for processing. Eventually, information captured using RDC results in money being deposited into an account according to details on the physical check.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

FIG. 5 illustrates scanned images of three checks in accordance with some examples.

DETAILED DESCRIPTION

Figure 1:
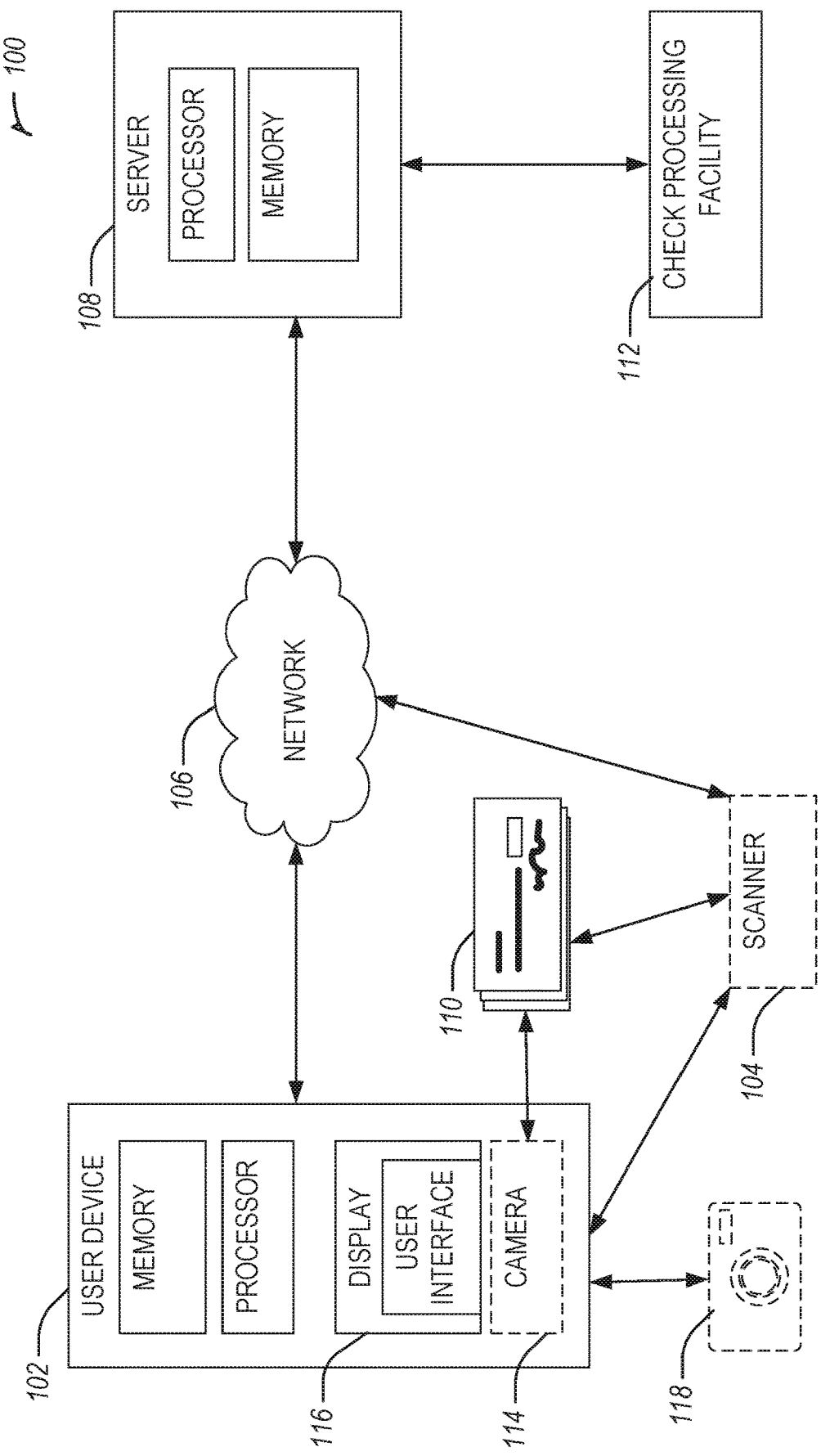
FIG. 1 illustrates a system for multi-capture for remote deposit in accordance with some examples.

The systems and techniques described herein may be used to capture multiple documents (e.g., checks) via a camera or a scanner. The system and techniques described herein may be used on a wide variety of documents, such as checks, contracts, governmental forms, banking forms, health forms, etc.

Although digitalizing documents is popular, when capturing multiple double-sided documents, it is often challenging to effectively obtain clear, unobstructed images of both sides of the double-sided documents. Further issues may arise in attempting to match an image of a back side of a document with an image of a front side of a document, especially for multiple documents. The systems and techniques discussed herein address those issues by, for example, providing image correction, a rejection alert, or automated front to back side matching.

When feeding a stack of checks for deposit through a scanner, several technological problems arise. For example, effectively obtaining clear pictures of the front and back of the checks is often challenging, especially when users are not used to scanning checks. Additionally, matching images of a front to a back for a given check has been done only manually, which is tedious, prone to errors, time consuming, and often not possible (e.g., when there are hundreds or thousands of checks). The systems and techniques described herein provide technical solutions to these issues by performing image correction, outputting a rejection alert, or matching a front and a back of a check automatically, for example based on geometrical features.

The systems and techniques described herein enable a customer to scan a stack of checks through a traditional "all-in-one" printer and scanner commonly found at homes or in small business offices. These scanners are not designed for checks, but they may have a document feeder or a flatbed. Once scanned, issues may be identified, such as piggybacking of the checks (e.g., one check partially covering another because they are fed into the scanner in an overlapping manner), blurry images, etc. A prompt may be provided (e.g., via a display, sound, haptic feedback, etc.) to the user to rescan a specific check or groups of checks (e.g., "Check #5938 is too blurry or blocked, please rescan this check.", "The blue check is too blurry or blocked, please rescan this check.", etc.).

When the customer flips the checks and scans the back of the checks, the order may be reversed or shuffled. Although checks appear similar, there are differences that may be used to match the images. Geometrical features may be used to pair the image of a back to the front. Checks may have unique defects such as creases, rips, crinkles, etc., that may be used to match images. Checks may have different colors or patterns that may be used to match images. If perforated and ripped out of a book, the pattern of the perforations may be unique. Checks may have different sizes and dimensions may be matched. For a given stack of checks, one or more of these factors may be used to pair the images of the front and the back.

Customers often receive a lot of checks that are to be deposited via mobile remote deposit capture (MRDC) (e.g., a birthday, Christmas, garage sale, etc.). One technological problem that arises is that a significant amount of time is required to snap individual pictures of a front and back of each check, one by one. Further, they may not be automatically matched, tedious, prone to errors, or the like. The systems and techniques described herein may be used to capture multiple checks via video and automatically match the front and back of a check. A set of checks may be arranged on a surface (e.g., a flat surface), and video of the set of checks may be captured. In an example, capturing video of multiple checks includes hovering a camera (e.g., attached to a user device or a standalone camera) over each check of the multiple checks. This may occur in succession in two steps (e.g., front side of check A, then flip and back side of check A) or in two passes (e.g., front side of all checks then back side of all checks). As the customer moves the camera over each check, it is captured. In the second example, after the first pass (e.g., fronts of the checks captured), a second video pass may be performed on the backs of the checks. The images pulled from the videos for the fronts and backs may be paired for a given check (or all of the checks). Although checks appear similar, there are differences that may be used to match the images. Geometrical features may be used to pair the image of a back to the front. Checks may have unique defects such as creases, rips, crinkles, etc., that may be used to match images. Checks may have different colors or patterns that may be used to match images. If perforated and ripped out of a book, the pattern of the perforations may be unique. Checks may have different sizes and dimensions may be matched. For a given stack of checks, one or more of these factors may be used to pair the images of the front and the back. A check may be deposited (e.g., similar to a manual MRDC, for example with a customer reviewing or approving a check on an individual basis or a set of checks in bulk).

When there is an error in a video, a prompt may be output (e.g., via a display, a sound, haptic feedback, etc.) to recapture via video of one or more of the checks (e.g., based on errors related to overlaps, folds, blurry, etc.). In an example, a video file including multiple checks on the front and the back may be uploaded to a bank via an application programming interface (API) to a RDC system. The bank or RDC system may identify an error correction (e.g., and output an instruction to retake an image or video). In some examples, further processing (e.g., matching the fronts and backs into individual deposits in bulk) may occur at the bank or RDC system.

FIG. 1 illustrates a system 100 for multi-capture for remote deposit in accordance with some examples. In FIG. 1, the system 100 includes a user device 102, a network 106, and a server 108 (e.g., having memory and a processor). In some examples, a check depository 112 may be used. The system 100 may include a scanner 104 or a camera (e.g., a camera 114 of the user device 102 or an external camera 118). The user device 102 includes a memory for storing instructions and a processor for processing the instructions. The user device 102 may include a display 116 to present a user interface. The user device 102 may include one or more of a mobile device, a laptop, a tablet, a desktop computer, etc. A camera may be used to capture images. The scanner 104 may include one or ore of a traditional all-in-one printer with scanner, a flatbed scanner, a sheet-fed scanner, a portable handheld scanner, etc.

In an example, the scanner 104 may be used to capture a first set of images of respective first sides of each check of a plurality of checks 110. The scanner 104 may be used to capture a second set of images of respective second sides of each check of the plurality of checks 110. Once captured, the first set of images and the second set of images may be sent to the user device 102 or the server 108. For example, the scanner 104 may send the images to the user device 102 via the network 106, save the images to the memory of the user device 102 (e.g., via a wired or wireless connection), upload the images to the server 108 via the network 106, or the like. The user device 102 or the server 108 may generate a pair of images for each check of the plurality of checks 110. In some examples, the first or second set of images may include a single image with two or more of the plurality of checks 110 captured. In other examples, the first or second set of images may have images with only one check captured of the plurality of checks 110. When more than one check is captured in an image, individual images of each check may be extracted.

In some examples, one or more geometrical features of the first side of a respective check of the plurality of checks 110 may be compared to one or more geometrical features of the second side of the respective check of the plurality of checks 110. Based on a result of the comparison, a pair of images may be selected. The pair of images may represent a single check of the plurality of checks 110. In some examples, the pair of images may be converted to a standardized or other format, such as a banking industry standard format for checks, such as a tag image file format (TIFF or TIF), for example as defined by the American National Standards Institute (ANSI). The pair of images or the converted format (e.g., TIFF file) may be sent from the user device 102 to the server 108 via the network 106 or (when generated by the server 108) from the server 108 to the check depository 112, for example via an API call.

In some examples, a camera (e.g., the camera 114 of the user device 102 or the external camera 118) may be used to capture a first video of a first side of each check of the plurality of checks 110. The camera may capture a second video of a second side of each check of the plurality of checks 110. The user device 102 may extract a first set of respective individual images of the first side of each check of the plurality of checks 110 from the first video. The user device 102 may extract a second set of respective individual images of the second side of each check of the plurality of checks from the second video.

The user device 102 (e.g., the processor of the user device 102) may compare one or more geometrical features of the first side of each check of the plurality of checks 110 as represented in the first set of respective individual images to geometrical features of the second side of each check of the plurality of checks 110 as represented in the second set of respective individual images. Based on the comparison, an image from the first set of respective individual images for a check and a corresponding image from the second set of respective individual images for a check may be selected to form a pair of images. The user device 102 or the server 108 (e.g., after being sent the pair of images from the user device 102 via the network 106) may convert the pair of images to a standard or other format (e.g., a TIFF format). The user device 102 or the server 108 may output, such as via an API call, a converted file to the check depository 112.

In an example, the scanner 104 may include an all-in-one printer such as on including a flatbed scanner or document feeder scanner. All-in-one printers are not designed for specifically scanning one kind of document, such as checks. In an example, the scanner 104 may be a scanner coupled to the user device 102. When using a flatbed scanner, a set of checks may be placed on glass of the flatbed scanner. When using a document feeder scanner, a set of checks may be fed one by one through the document feeder scanner (e.g., manually or automatically).

The display 116 of the user device 102 may output instructions or information on the user interface to guide a user while using the camera 114 or the camera 118 to capture a video of a document. The instructions or information may include displaying an alert (or audibly or haptically alerting) the user to move the user device 102 in a particular direction to better capture the video. The user interface of the display 116 may be used to display instructions a user to flip a document over to another side (e.g., from a front side to a back side) to capture the other side. In some examples, audio or haptic feedback may be provided in addition to or instead of the displayed instructions.

Figure 2:
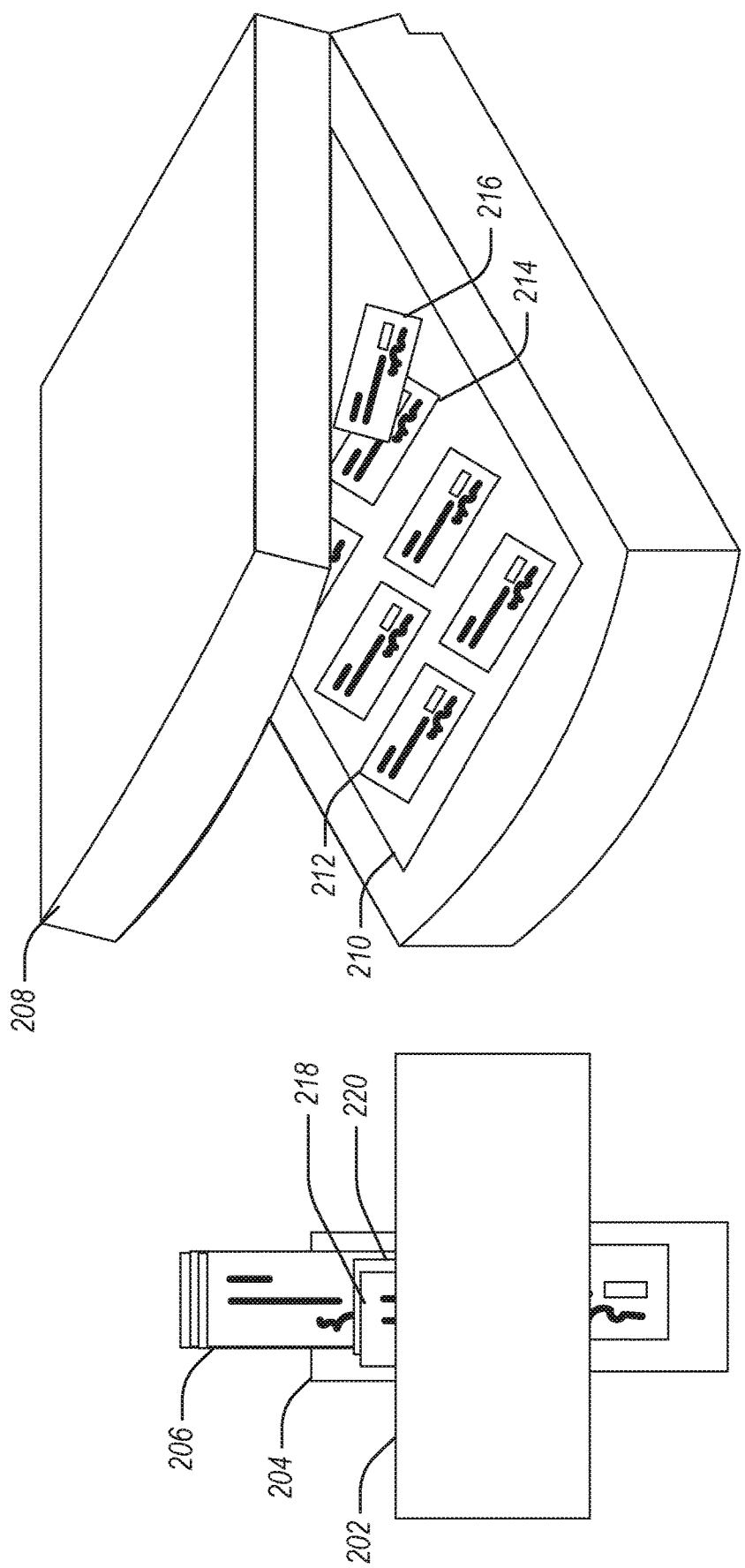
FIG. 2 illustrates two examples of scanner devices in accordance with some examples.

FIG. 2 illustrates two examples of scanner devices according to various examples. A first example includes a sheet-fed scanner 202, with a feeder 204, and a second example includes a flatbed scanner 208, with a flatbed glass 210. The sheet-fed scanner 202 or the flatbed scanner 208 may be used as described herein with respect to scanners, such as scanner 104 of FIG. 1. FIG. 2 shows a plurality of checks, including check 206, check 218, and check 220, to be scanned by the sheet-fed scanner 202. The checks 218 and 220 are turned to a first side and placed on the feeder 204 of the sheet-fed scanner 202. In an example, the checks 206, 218, and 220 may be scanned or attempted to be scanned with the sheet-fed scanner 202. In some examples, an error may occur, such as when two checks stick together or overlap for some reason, such as shown in FIG. 2 with checks 218 and 220. Check 220 is obscured by check 218, and any image captured by the sheet-fed scanner 202 may not be sufficient to determine necessary information form the check 220. In some examples, a scanned image may not satisfy a quality metric, such as due to check 220 being blocked by check 218, dust or debris on the sheet-fed scanner 202 or a check, a misalignment of a check, a crease or a fold on a check, or the like. An image captured by the sheet-fed scanner 202 may be evaluated to determine a quality metric or score. The quality metric or score may include an image analysis specific to a document type (e.g., in the illustrative example of FIG. 2, checks). In some examples, an image may be de-skewed before processing. When an image fails to satisfy the quality metric or a quality threshold, a notification may be output (e.g., for display, audibly, via haptic feedback, etc.) to a user to recapture the image (e.g., via scanning, video, single check image capture, multiple check image capture, etc.). The notification may indicate which image or check to recapture or may instruct the user to recapture all checks or a set of checks.

The quality threshold may include a minimum image quality necessary for identifying information on a check. For example, a quality threshold may include a measure of at least one of resolution, noise, frame rate, signal to noise ratio (SNR), artifacts (e.g., macroblocking or pixelation), or the like of an image or video.

The flatbed scanner 208 may be used to scan checks 212, 214, and 216. These checks are turned to a first side and placed on the flatbed glass 210 of the flatbed scanner 208. A scanned image of a first side of each check of the checks 212, 214, and 216 may be captured with the flatbed scanner 208. A scanned image may not satisfy a quality metric when a quality score of the scanned image is below a quality score threshold, for example when check 214 is covered by check 216. In some examples, the scanned image may not satisfy a quality metric because the scanned image is blurred (e.g., information such as words or images on a check cannot be deciphered or read, by a machine or person), an image on an opposite side partially appears in the scanned image, a ripple pattern appears in the scanned image, the scanned image has uneven colors, the scanned image has a smear, dot, or line that was not present in a check, or the like.

Figure 3:
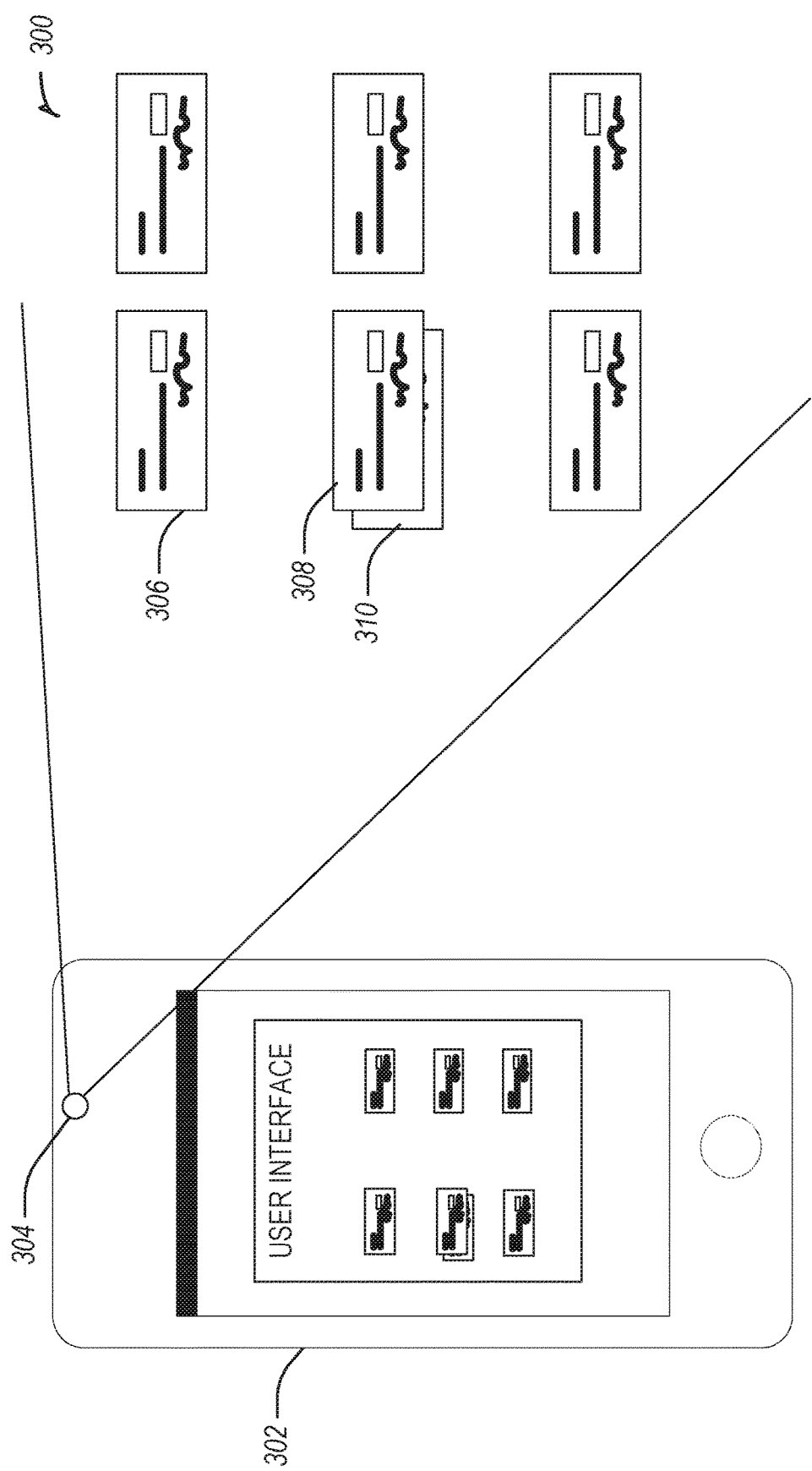
FIG. 3 illustrates a system for capturing a plurality of checks in accordance with some examples.

FIG. 3 illustrates a system 300 for capturing a plurality of checks. FIG. 3 shows a mobile device 302, including a camera 304. In some examples, the mobile device 302 may be an example of the user device 102 of FIG. 1 and the camera 304 may be an example of the camera 114 of FIG. 1.

FIG. 3 shows a plurality of checks, such as check 306, check 308, and check 310, turned to a first side and placed on a surface (e.g., a flat surface). A first video of a first side of each check of the plurality of checks may be captured using the camera 304 of the mobile device 302. In some examples, the first video may not satisfy a quality metric or have an identified capture issue such as check 310 being blocked by check 308. When an image fails to satisfy the quality metric or a quality threshold, a notification may be output (e.g., for display, audibly, via haptic feedback, etc.) to a user to recapture the image (e.g., via scanning, video, single check image capture, multiple check image capture, etc.). The notification may indicate which image or check to recapture or may instruct the user to recapture all checks or a set of checks. In another example, the first video may not satisfy a quality metric because the quality score of the first video is below a quality score threshold due to an image from the first video being blurry, unfocused, low resolution, low frame rate, or the like.

Figure 4:
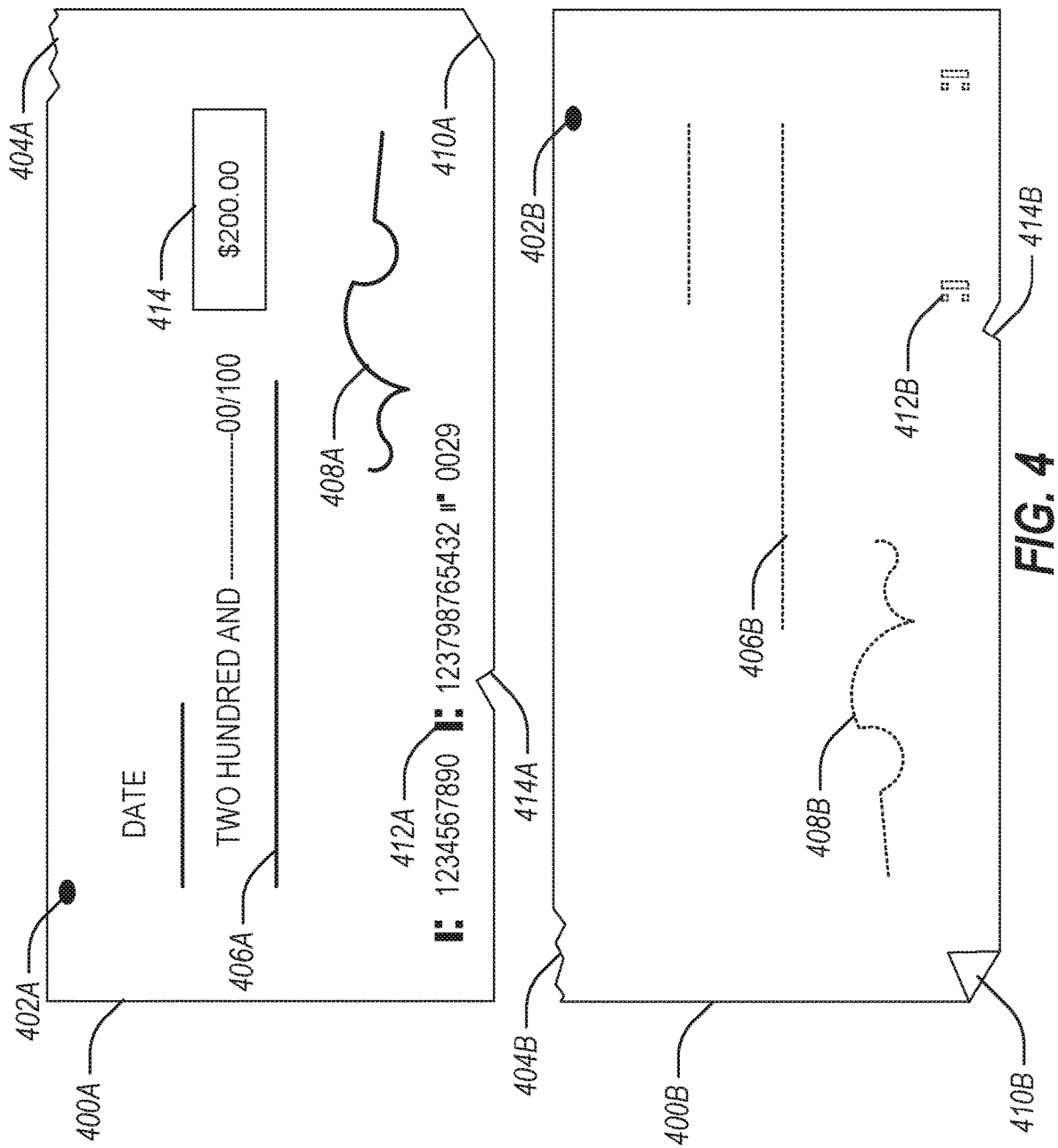
FIG. 4 illustrates an individual image of a first side of a check and an individual image of a second side of a check in accordance with some examples.

FIG. 4 illustrates an individual image of a first side 400A of a check and an individual image of a second side 400B of a check. The check includes a set of geometrical features for illustration, although some checks may have any number of distinguishing geometrical features, including zero, one, two, etc. In FIG. 4, the illustrated geometrical features include a fold 410A-B, a crease or wrinkle 404A-B, a stain or smudge 402A-B, a tear 414A-B, or a dimension of the check (e.g., height or width). In some examples, features of the check that are not geometrical may be used, such as a date, a signature line 408A-B, an account number, a routing number, a MICR line 412A-B, an amount line 406A-B, a number value line 414, or the like The MICR line 412A-B may be used to determine an orientation, since it is usually fixed in place in most checks. Even when not fixed, the MICR line 412A-B uses a standard font, and the font may be used for determining an orientation of a check. In some examples, metadata from a scan may be used to determine an image pair. For example, a scanner may place images in a specific order, such as front to back to front to back, or all fronts then all backs, depending on the scanning method used. Similarly, when capturing video after checks are flipped, they may be in generally similar locations, and images at respective locations may be used as a first set of images to check using the geometrical features described herein.

Geometrical features of the first side 400A of a check may be compared to geometrical features of the second side 400B of the check to determine an image pair. Based on the comparison, an image from a first set of images (e.g., including an image of the first side 400A) may be selected that corresponds to an image from a second set of images (e.g., including an image of the second side 400B) to form a pair of images. The pair of images may represent a single check (e.g., having the first side 400A and the second side 400B). In some examples, one or more features may be compared to determine a match. For example, the tear 414A of the first side 400A may be compared to the tear 414B of the second side 400B to determine a match (albeit flipped horizontally due to the location of the tear). In some example, such as the fold 410A-B, a different appearance may be found in the first side 400A compared to the second side 400B, such as the flap that appears on the second side 400B, but does not appear on the first side 400A. Some comparisons may include compensating for bleed through from one side to another, such as with respect to the amount line 406A, the MICR line 412A, or the signature line 408A appearing faintly or less dark in corresponding locations of the second side 400B, such as at 406B, 412B, or 408B. In some examples a single feature may be sufficient to distinguish a check from other checks captured in a plurality of checks. In other examples, two or more features may be used. An orientation of a check may be determined from text orientation or other feature of the check. A check may be de-skewed before comparison, in some examples.

FIG. 5 illustrates scanned images of three checks including check 502, check 504 and check 506. In FIG. 5, the three checks 502, 504, and 506 were scanned or captured via video. A verification technique may be used on the checks to determine whether they are readable or have a quality issue. For example, check 502 as illustrated does not have any quality issues, and information on the check may be machine read (e.g., via the MICR line, optical character recognition (OCR), etc.). Check 504 is illustrated with a potential quality issue because it is missing a corner. However, the text or information of check 504 is still readable via a machine reader and thus a quality metric for check 504 may remain high (e.g., above a threshold for triggering a notification to recapture an image of the check 504). Check 506, however, has missing information that appears in FIG. 5 as being obscured, blurry, or otherwise unreadable by a machine reader.

In an example, a quality metric determination may be made for checks 502, 504, and 506. Checks 502 and 504 may pass the quality metric determination, while check 506 may fails to satisfy the quality metric or a quality threshold. A notification may be output for check 506 (e.g., for display, audibly, via haptic feedback, etc.) to a user to recapture the check 506 (e.g., via scanning, video, single check image capture, multiple check image capture, etc.). The notification may indicate which image or check to recapture or may instruct the user to recapture all checks or a set of checks. Checks 502 and 504 may be indicated to not need recapturing. Recapture of check 506 may be performed using a different technique than the initial attempt (e.g., if initially a video was captured, a scan or image capture may be performed to recapture)

Figure 6A:
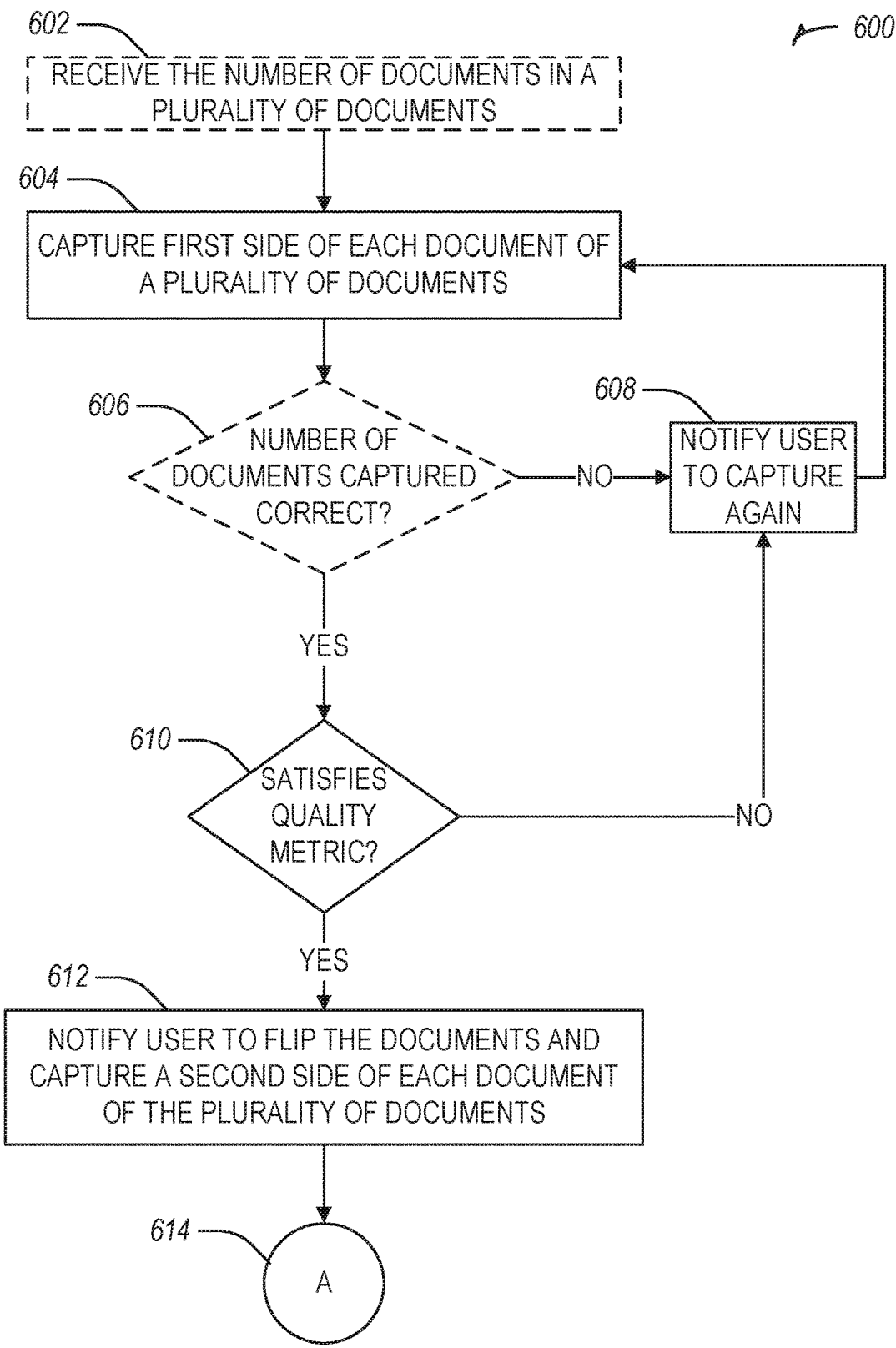
FIGS. 6A-6B illustrate a flowchart showing a technique for capturing a plurality of documents in accordance with some examples.

FIG. 6A illustrates a flowchart showing a technique 600 for capturing a plurality of documents in accordance with some examples. In an example, operations of the technique 600 may be performed by processing circuitry, for example by executing instructions stored in memory. The processing circuitry may include a processor, a system on a chip, or other circuitry (e.g., wiring). For example, technique 600 may be performed by processing circuitry of a device (or one or more hardware or software components thereof), such as those illustrated and described with reference to FIG. 1.

The technique 600 includes an optional operation 602 to receive a number of documents in a plurality of documents. The plurality of documents may include a plurality of checks. In some examples, this operation is omitted, and the number of documents may optionally be determined based on a later scan or video.

The technique 600 includes an operation 604 to capture a first side of each document of a plurality of documents. Operation 604 may include capturing the first side of each document using a scanner or video, as described herein.

The technique 600 includes an optional operation 606 to determine whether the number of documents captured in operation 604 is correct (e.g., when the number of documents is received in operation 602). The number of documents captured is correct when the number of documents captured matches the received number of documents in a plurality of documents. When the result of operation 606 is a determination that the number of documents captured in operation 604 is not correct, technique 600 may include an operation 608 to output a notification to a user that the technique 600 is to return to operation 604 to recapture the first side of each document or a set of documents (e.g., a missing document) of the plurality of documents. In some examples, instead of operation 608, the technique 600 may include asking the user to verify that the number of captured documents is correct (rather than the number received in operation 602), and using the number of captured documents in future operations. The user may be prompted to choose whether to recapture the documents or update the number of documents.

When the result of operation 606 is a determination that the number of documents captured in operation 604 is correct, technique 600 includes an operation 610 to determine whether the captured first side of each document of a plurality of documents satisfies a quality metric. The quality metric may be determined from one or more images corresponding to each of the plurality of documents. The quality metric may be compared to a threshold in operation 610 to determine whether to proceed to operation 612 or return to a previous portion of the technique 600. When the result of operation 610 is a determination that the captured first side of each document of a plurality of documents in operation 604 does not satisfy a quality metric (e.g., a determined quality fails to satisfy a threshold), the technique 600 may include operation 608 to recapture one or more documents (e.g., a document that failed to satisfy the threshold). Documents that did not fail to satisfy the quality metric may not be retaken or the user may be notified to only retake those documents that failed the quality metric. In some examples, all documents may be recaptured.

When the result of operation 610 is a determination that the captured first side of each document of all of the plurality of documents in operation 604 satisfies the quality metric, the technique 600 includes an operation 612 to notify the user to flip the documents (e.g., turn to a second side) and capture the second side of each document of the plurality of documents. The technique 600 continues as shown in FIG. 6B, via connector A 614.

Figure 6B:
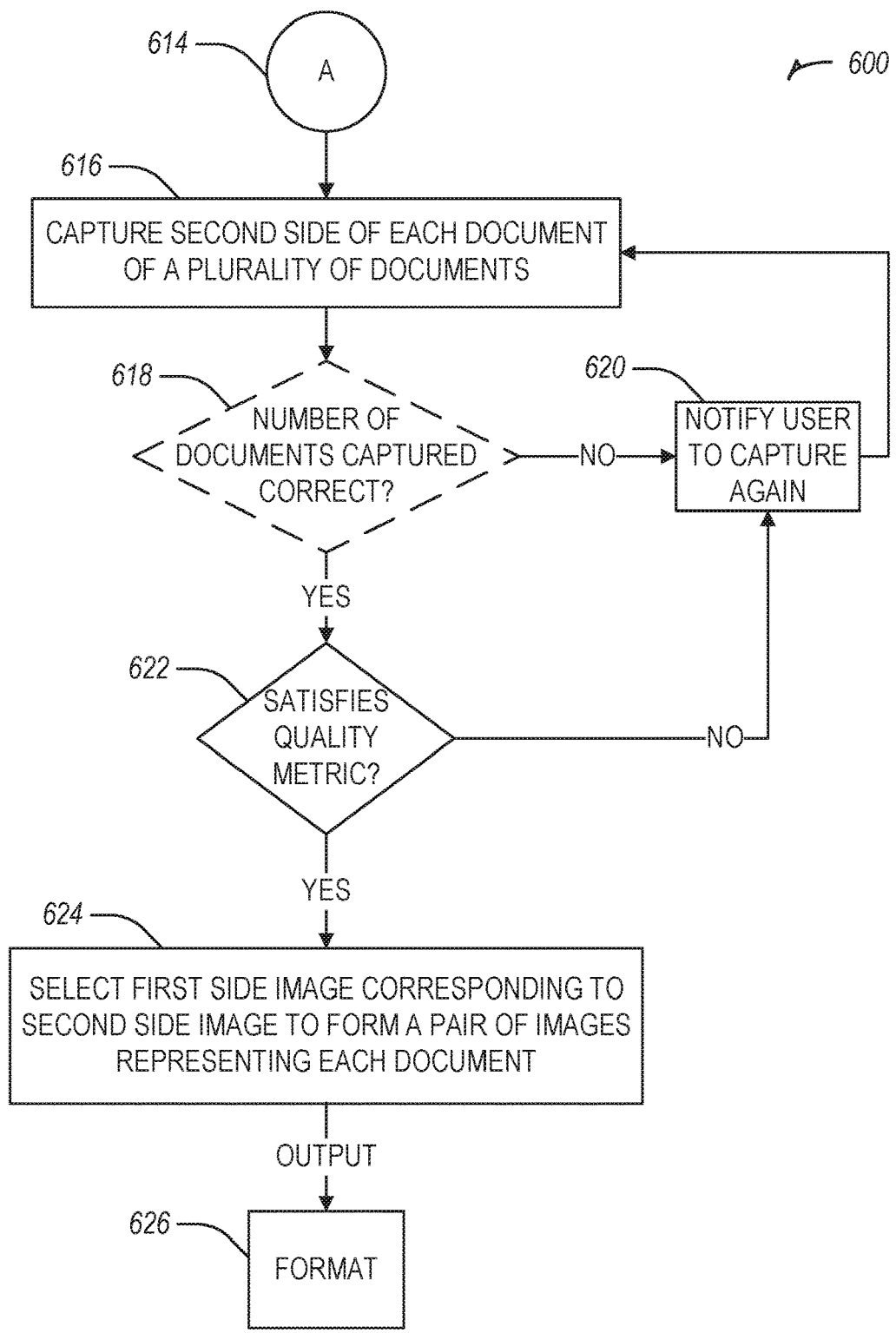

In FIG. 6B, connector A 614 is shown as the continuation of the technique 600 from FIG. 6A. FIGS. 6A and 6B may form the technique 600, but are split onto two different pages to show details. In some examples, a portion of the technique 600 may be used.

The technique 600 includes an operation 616 to capture a second side of each document of a plurality of documents. The technique 600 includes an optional operation 618 to determine whether a number of documents captured in operation 616 is correct. The number of documents captured in operation 616 is correct when the number of documents captured in operation 616 is the same as the number of documents captured in operation 604 or when the number of documents captured in operation 616 matches the number received in operation 602 (or via later user input).

When the result of operation 618 is a determination that the number of documents captured in operation 616 is not correct (e.g., does not match those captured in operation 604 or a number received from a user), the technique 600 includes an operation 620 to notify the user to return to operation 616 to recapture the second side of one or more documents of the plurality of documents (e.g., a document that was not captured or all documents).

When the result of operation 618 is a determination that the number of documents captured in operation 616 is correct, the technique 600 includes an operation 622 to determine whether the captured second side of each document of a plurality of documents in operation 616 satisfies a quality metric (e.g., has a determined quality value that satisfies a threshold).

When the result of operation 622 is a determination that the captured second side of one or more documents of the plurality of documents does not satisfy the quality metric, the technique 600 includes an operation 620 to notify the user to return to operation 616 to recapture the second side of the one or more documents. In some examples, all or more than the one or more documents may be recaptured.

When the result of operation 622 is a determination that the captured second side of all documents satisfy the quality metric, the technique 600 includes an operation 624 to automatically select a first side image and a corresponding a second side image (e.g., based on a match between geometrical features of the first side image and the second side image) to form a pair of images representing a document. A pair of images for each document of the plurality of documents may be automatically selected in operation 624. When an image or pair is missing or unable to be matched, a notification may be output, such as to instruct recapture of an image, have a user perform a manual check, or the like.

The technique 600 includes operation 628 to output the pair of images representing each document in a particular format, such as a black and white TIFF format, for example via an API.

Figure 7:
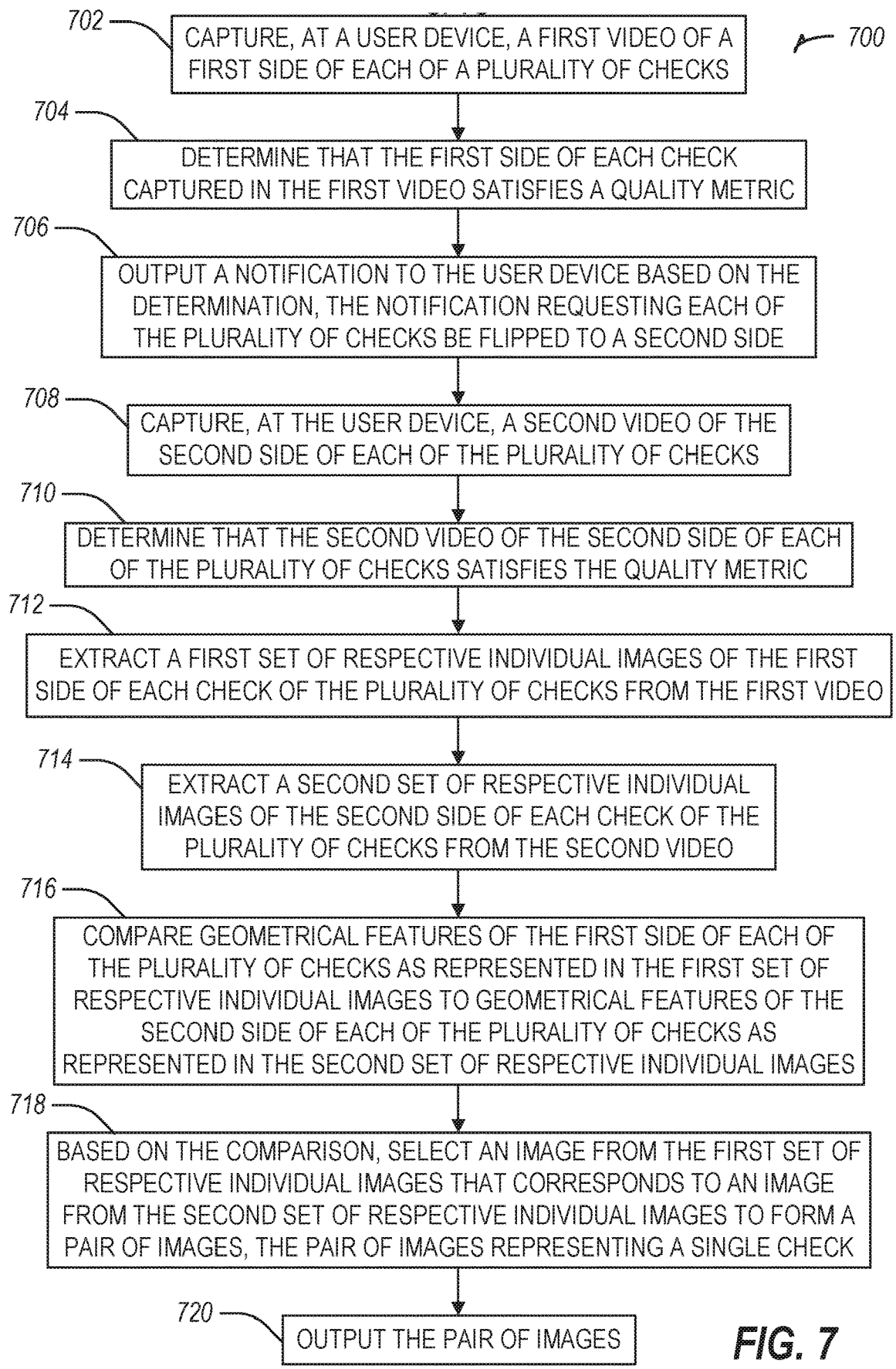
FIG. 7 illustrates a flowchart showing a technique for using a user device to capture a plurality of checks in accordance with some examples.

FIG. 7 illustrates a flowchart showing a technique 700 for using a user device to capture a plurality of checks in accordance with some examples.

The technique 700 includes an operation 702 to capture, at the user device, a first video of a first side of each of a plurality of checks. The video may be captured by a camera of the user device, a camera external to the user device (e.g., coupled, communicatively coupled, etc.), or the like.

The technique 700 includes an operation 704 to determine that the first side of each check captured in the first video satisfies a quality metric. Operation 704 may include determining that a quality score for a first side of a first check of the plurality of checks in a frame of the first video exceeds a quality score threshold. In some examples, operation 704 may include determining whether the first side of a check or each check is a front side or a back side.

The technique 700 includes an operation 706 to output a notification to the user device based on the determination, the notification requesting each of the plurality of checks be flipped to a second side. In an example, the first side is a front side of the plurality of checks and the second side is a back side of the plurality of checks. The notification may be displayed on a user interface, such as a on a display of the user device.

The technique 700 includes an operation 708 to capture, at the user device, a second video of the second side of each of the plurality of checks.

The technique 700 includes an operation 710 to determine that the second video of the second side of each of the plurality of checks satisfies the quality metric.

The technique 700 includes an operation 712 to extract a first set of respective individual images of the first side of each check of the plurality of checks from the first video. Operation 712 may include extracting a frame of the first video that includes a check of the plurality of checks, and using the frame as one of the first set of respective individual images. In some examples, image processing may be performed, such as to de-skew an image, resize an image, crop an image, etc.

The technique 700 includes an operation 714 to extract a second set of respective individual images of the second side of each check of the plurality of checks from the second video.

The technique 700 includes an operation 716 to compare geometrical features of the first side of each of the plurality of checks as represented in the first set of respective individual images to geometrical features of the second side of each of the plurality of checks as represented in the second set of respective individual images. Operation 716 may include comparing at least one of: a size of a check, a unique characteristic of a check including at least one of a fold, a tear, a stain, a mark, a crease, or the like, an orientation of a check determined from a MICR line, an orientation of a check determined from text orientation, or the like.

The technique 700 includes an operation 718 to based on the comparison, select an image from the first set of respective individual images that corresponds to an image from the second set of respective individual images to form a pair of images, the pair of images representing a single check.

The technique 700 includes an operation 720 to output the pair of images. Operation 720 may include converting the pairs of images to a set of Tag Image File Format (TIFF) files. The set of TIFF files may be output, such as via an API, to a check depository.

The technique 700 may include receiving a user input identifying a number of checks of the plurality of checks, and determining that a number of captured checks in the first video or the second video does not match the number of checks of the plurality of checks. In this example, a notification may be output to the user device based on the determination, the notification requesting the first video or the second video be recaptured.

The technique 700 may include an operation to provide instructions on a user interface, while capturing the video, the instructions including an alert to move the user device in a particular direction. In an example, this operation may include determining that a number of checks captured in the first video or the second video does not match the number of checks of the plurality of checks, and outputting a notification to the user device based on the determination, the notification requesting that at least one of the first video or the second video be recaptured.

The technique 700 may include determining that a number of the first set of respective individual images does not match a number of the second set of respective individual images, and outputting a notification to the user device based on the determination, the notification requesting that the video be recaptured. The technique 700 may include determining that a side of a check captured in a third video fails to satisfy the quality metric, and in response, outputting a notification to the user device based on the determination, the notification requesting that the third video be recaptured.

The technique 700 may include an operation to determine, after capturing the first video or the second video, that one or more checks of the plurality of checks are overlapping. This operation may include outputting a notification to the user device based on the determination, the notification requesting that the first video or the second video be recaptured. The technique 700 may include an operation to determine that one or more images in the first set of respective individual images or in the second set of respective individual images are blurry. This operation may include outputting a notification to the user device based on the determination, the notification requesting that the first video or the second video be recaptured.

Figure 8:
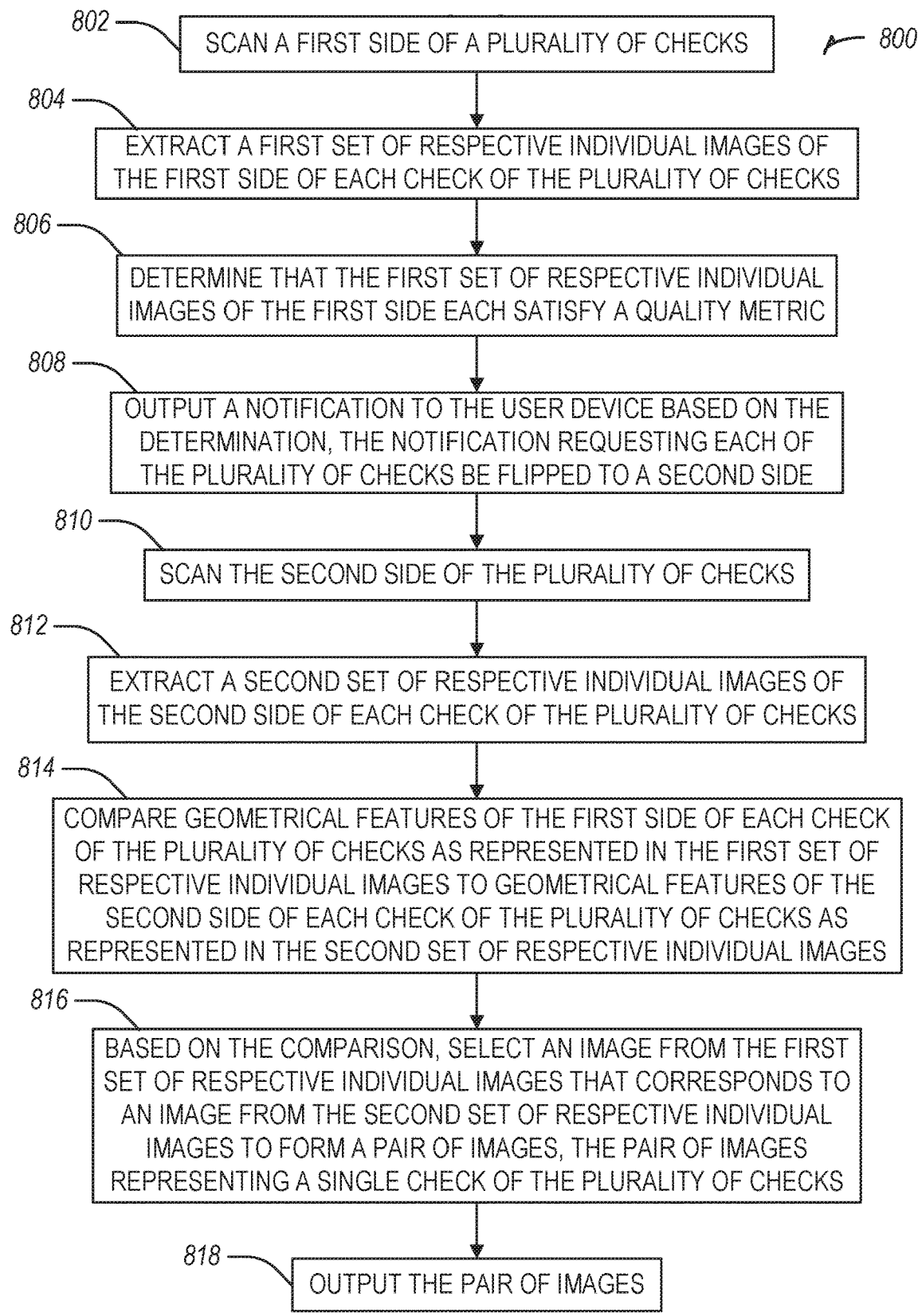
FIG. 8 illustrates a flowchart showing a technique for using a scanner to capture a plurality of checks in accordance with some examples.

FIG. 8 illustrates a flowchart showing a technique 800 for using a scanner to capture a plurality of checks in accordance with some examples.

The technique 800 includes an operation 802 to scan a first side of a plurality of checks.

The technique 800 includes an operation 804 to extract a first set of respective individual images of the first side of each check of the plurality of checks. In some examples, image processing may be performed, such as to de-skew an image, resize an image, crop an image, etc.

The technique 800 includes an operation 806 to determine that the first set of respective individual images of the first side each satisfy a quality metric. In an example, operation 806 includes determining that a quality score for the first side of each check extracted in the first set of respective individual images exceeds a quality score threshold.

The technique 800 includes an operation 808 to output a notification to the user device based on the determination, the notification requesting each of the plurality of checks be flipped to a second side. The notification may be displayed on a user interface, such as a on a display of the user device. In an example, the first side is a front side of the plurality of checks and the second side is a back side of the plurality of checks. In some examples, operation 808 may include determining whether the first side of a check or each check is a front side or a back side.

The technique 800 includes an operation 810 to scan the second side of the plurality of checks.

The technique 800 includes an operation 812 to extract a second set of respective individual images of the second side of each check of the plurality of checks. In an example, the technique 800 may include determining that the second set of respective individual images of the second side of each check of the plurality of checks satisfies the quality metric before operation 814.

The technique 800 includes an operation 814 to compare geometrical features of the first side of each check of the plurality of checks as represented in the first set of respective individual images to geometrical features of the second side of each check of the plurality of checks as represented in the second set of respective individual images. Operation 814 may include comparing at least one of: a size of a check, a unique characteristic of a check including at least one of a fold, a tear, a stain, a mark, a crease, or the like, an orientation of a check determined from a MICR line, an orientation of a check determined from text orientation, or the like.

The technique 800 includes an operation 816 to based on the comparison, select an image from the first set of respective individual images that corresponds to an image from the second set of respective individual images to form a pair of images, the pair of images representing a single check of the plurality of checks.

The technique 800 includes an operation 818 to output the pair of images. Operation 818 may include converting the pairs of images to a set of Tag Image File Format (TIFF) files. The set of TIFF files may be output, such as via an API, to a check depository.

The technique 800 may include an operation to receive a user input identifying a number of checks of the plurality of checks and determining that a number of captured checks in the first set of respective individual images of the first side or the second set of respective individual images of the second side does not match the identified number of checks. This operation may include outputting a notification to the user device based on the determination, the notification requesting that the first side or the second side of at least one check be rescanned.

The technique 800 may include determining that a number of captured checks in the first set of respective individual images of the first side does not match a number of captured checks in the second set of respective individual images of the second side, and outputting a notification to the user device based on the determination, the notification requesting the first scanned image or the second scanned image be rescanned.

The technique 800 may include determining, after scanning the first side or the second side of the plurality of checks that one or more checks, on the first side or the second side, of the plurality of checks are overlapping, and outputting a notification to the user device based on the determination, the notification requesting that the first side or the second side of the plurality of checks be rescanned.

The technique 800 may include an operation to determine that a side of a check captured in a third scanned image does not satisfy the quality metric. In response, this operation may include outputting a notification to the user device based on the determination, the notification requesting that the side of the check captured in the third scanned image be rescanned.

Figure 9:
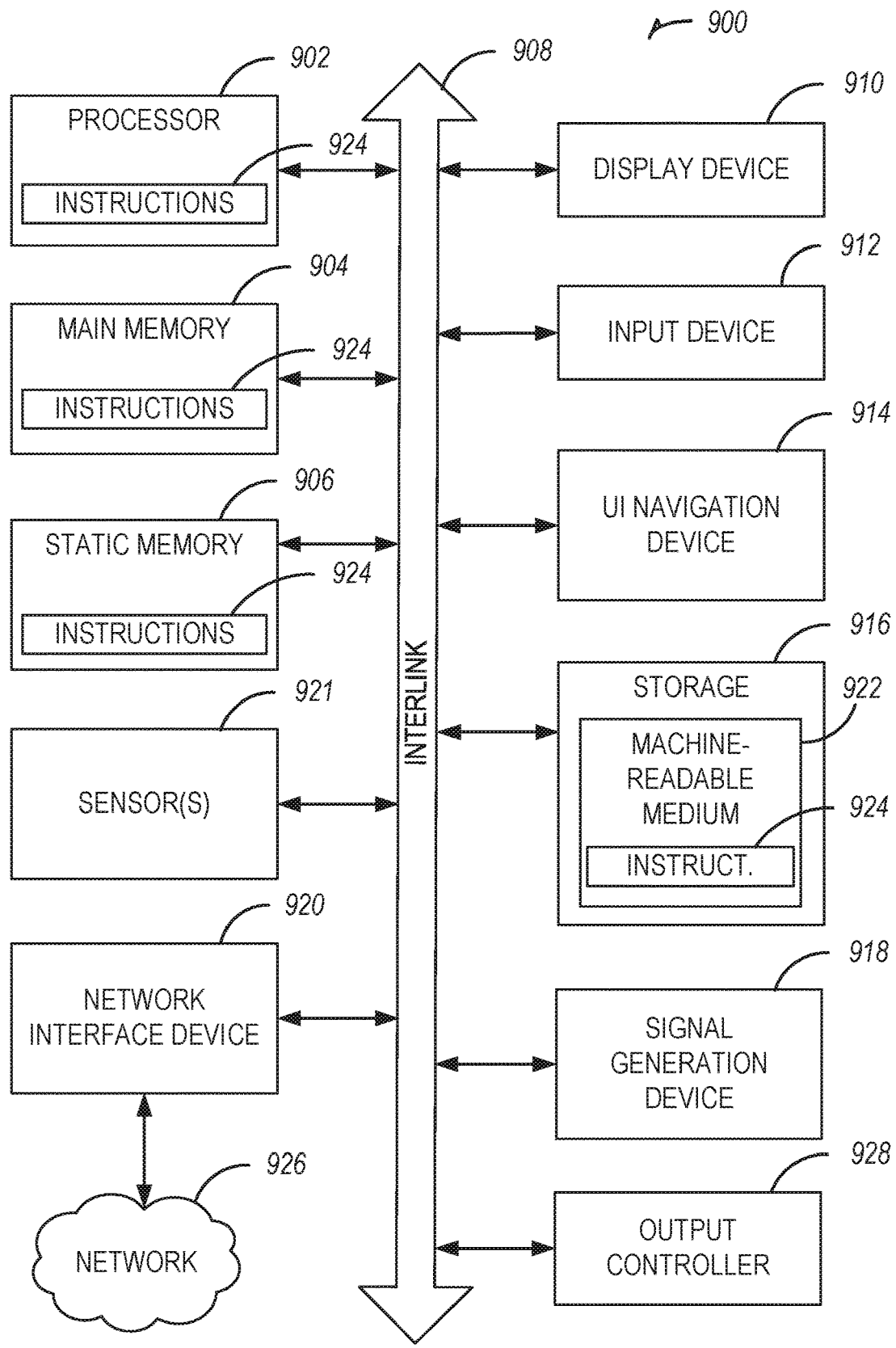
FIG. 9 illustrates generally an example of a block diagram of a machine upon which any one or more of the techniques discussed herein may perform in accordance with some examples.

FIG. 9 illustrates, generally, an example of a block diagram of a machine 900 upon which any one or more of the techniques (e.g., methodologies) discussed herein may perform in accordance with some examples. In alternative examples, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, alphanumeric input device 912, and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS)

sensor, compass, accelerometer, or other sensors. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine-readable medium 922 that is non-transitory on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine-readable media.

While the machine-readable medium 922 is illustrated as a single medium, the term "machine-readable medium" may include a single medium or multiple media (e.g., a centralized or distributed database, or associated caches and servers) configured to store the one or more instructions 924.

The term "machine-readable medium" may include any medium that is capable of storing, encoding, or carrying instructions for execution by the machine 900 and that causes the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

The following, non-limiting examples, detail certain aspects of the present subject matter to solve the challenges and provide the benefits discussed herein, among others.

Example 1 is a method comprising: scanning a first side of a plurality of checks; extracting a first set of respective individual images of the first side of each check of the plurality of checks; determining that the first set of respective individual images of the first side each satisfy a quality metric; outputting a notification based on the determination, the notification requesting each of the plurality of checks be flipped to a second side; scanning the second side of the plurality of checks; extracting a second set of respective individual images of the second side of each check of the plurality of checks; comparing, using processing circuitry, geometrical features of the first side of each check of the plurality of checks as represented in the first set of respective individual images to geometrical features of the second side of each check of the plurality of checks as represented in the second set of respective individual images; based on the comparison, selecting an image from the first set of respective individual images that corresponds to an image from the second set of respective individual images to form a pair of images, the pair of images representing a single check of the plurality of checks; and outputting, from the user device, the pair of images.

In Example 2, the subject matter of Example 1 includes, determining that the second set of respective individual images of the second side of each check of the plurality of checks satisfies the quality metric before comparing the geometrical features.

In Example 3, the subject matter of Examples 1-2 includes, receiving a user input identifying a number of checks of the plurality of checks; determining that a number of captured checks in the first set of respective individual images of the first side or the second set of respective individual images of the second side does not match the identified number of checks; and outputting a notification to the user device based on the determination, the notification requesting that the first side or the second side of at least one check be rescanned.

In Example 4, the subject matter of Examples 1-3 includes, wherein the first side is a front side of the plurality of checks and the second side is a back side of the plurality of checks.

In Example 5, the subject matter of Examples 1-4 includes, determining that a number of captured checks in the first set of respective individual images of the first side does not match a number of captured checks in the second set of respective individual images of the second side; and outputting a notification to the user device based on the determination, the notification requesting at least one of the first set of respective individual images or at least one of the second set of respective individual images be rescanned.

In Example 6, the subject matter of Examples 1-5 includes, converting the pairs of images to a set of Tag Image File Format (TIFF) files; and outputting, via an application programming interface (API), the set of TIFF files to a check depository.

In Example 7, the subject matter of Examples 1-6 includes, wherein comparing geometrical features of the first side of each check of the plurality of checks as represented in the first set of respective individual images to the geometrical features of the second side of each check of the plurality of checks as represented in the second set of respective individual images includes comparing at least one of: a size of a check; a unique characteristic of a check including at least one of a fold, a tear, a stain, a mark, or a crease; an orientation of a check determined from a MICR line; or an orientation of a check determined from text orientation.

In Example 8, the subject matter of Examples 1-7 includes, determining, after scanning the first side or the second side of the plurality of checks that one or more checks, on the first side or the second side, of the plurality of checks are overlapping; and outputting a notification to the user device based on the determination, the notification requesting that the first side or the second side of the plurality of checks be rescanned.

In Example 9, the subject matter of Examples 1-8 includes, wherein determining that the first side of each check extracted in the first set of respective individual images satisfies the quality metric includes determining that a quality score for the first side of each check extracted in the first set of respective individual images exceeds a quality score threshold.

In Example 10, the subject matter of Examples 1-9 includes, determining that a side of a check captured in a third scanned image does not satisfy the quality metric; and in response, outputting a notification to the user device based on the determination, the notification requesting that the side of the check captured in the third scanned image be rescanned.

Example 11 is at least one non-transitory machine readable medium including instructions, which when executed by processing circuitry of a user device, cause the processing circuitry to perform operations to: scan a first side of a plurality of checks; extract a first set of respective individual images of the first side of each check of the plurality of checks; determine that the first set of respective individual images of the first side each satisfy a quality metric; output a notification to the user device based on the determination, the notification requesting each of the plurality of checks be flipped to a second side; scan the second side of the plurality of checks; extract a second set of respective individual images of the second side of each check of the plurality of checks; compare geometrical features of the first side of each check of the plurality of checks as represented in the first set of respective individual images to geometrical features of the second side of each check of the plurality of checks as represented in the second set of respective individual images; based on the comparison, select an image from the first set of respective individual images that corresponds to an image from the second set of respective individual images to form a pair of images, the pair of images representing a single check of the plurality of checks; and output the pair of images.

In Example 12, the subject matter of Example 11 includes, wherein the instructions further cause the processing circuitry to perform operations to determine that the second set of respective individual images of the second side of each check of the plurality of checks satisfies the quality metric before comparing the geometrical features.

In Example 13, the subject matter of Examples 11-12 includes, wherein the instructions further cause the processing circuitry to perform operations to: receive a user input identifying a number of checks of the plurality of checks; determine that a number of captured checks in the first set of respective individual images of the first side or the second set of respective individual images of the second side does not match the identified number of checks; and output a notification to the user device based on the determination, the notification requesting that the first side or the second side of at least one check be rescanned.

In Example 14, the subject matter of Examples 11-13 includes, wherein the first side is a front side of the plurality of checks and the second side is a back side of the plurality of checks.

In Example 15, the subject matter of Examples 11-14 includes, wherein the instructions further cause the processing circuitry to perform operations to: determine that a number of captured checks in the first set of respective individual images of the first side does not match a number of captured checks in the second set of respective individual images of the second side; and output a notification to the user device based on the determination, the notification requesting at least one of the first set of respective individual images or at least one of the second set of respective individual images be rescanned.

In Example 16, the subject matter of Examples 11-15 includes, wherein the instructions further cause the processing circuitry to perform operations to: convert the pairs of images to a set of Tag Image File Format (TIFF) files; and output, via an application programming interface (API), the set of TIFF files to a check depository.

In Example 17, the subject matter of Examples 11-16 includes, wherein to compare the geometrical features of the first side of each check of the plurality of checks as represented in the first set of respective individual images to the geometrical features of the second side of each check of the plurality of checks as represented in the second set of respective individual images, the instructions further cause the processing circuitry to perform operations to compare at least one of: a size of a check; a unique characteristic of a check including at least one of a fold, a tear, a stain, a mark, or a crease; an orientation of a check determined from a MICR line; or an orientation of a check determined from text orientation.

In Example 18, the subject matter of Examples 11-17 includes, wherein the instructions further cause the processing circuitry to perform operations to: determine, after scanning the first side or the second side of the plurality of checks that one or more checks, on the first side or the second side, of the plurality of checks are overlapping; and output a notification to the user device based on the determination, the notification requesting that the first side or the second side of the plurality of checks be rescanned.

In Example 19, the subject matter of Examples 11-18 includes, wherein to determine that the first side of each check extracted in the first set of respective individual images satisfies the quality metric the instructions further cause the processing circuitry to perform operations to determine that a quality score for the first side of each check extracted in the first set of respective individual images exceeds a quality score threshold.

In Example 20, the subject matter of Examples 11-19 includes, wherein the instructions further cause the processing circuitry to perform operations to: determining that a side of a check captured in a third scanned image does not satisfy the quality metric; and in response, outputting a notification to the user device based on the determination, the notification requesting that the side of the check captured in the third scanned image be rescanned.

Example 21 is a method comprising: capturing, at a user device, a first video of a first side of each of a plurality of checks; determining that the first side of each check captured in the first video satisfies a quality metric; outputting a notification to the user device based on the determination, the notification requesting each of the plurality of checks be flipped to a second side; capturing, at the user device, a second video of the second side of each of the plurality of checks; determining that the second video of the second side of each of the plurality of checks satisfies the quality metric; extracting a first set of respective individual images of the first side of each check of the plurality of checks from the first video; extracting a second set of respective individual images of the second side of each check of the plurality of checks from the second video; comparing, using processing circuitry of the user device, geometrical features of the first side of each of the plurality of checks as represented in the first set of respective individual images to geometrical features of the second side of each of the plurality of checks as represented in the second set of respective individual images; based on the comparison, selecting an image from the first set of respective individual images that corresponds to an image from the second set of respective individual images to form a pair of images, the pair of images representing a single check of the plurality of checks; and outputting, from the user device, the pair of images.

In Example 22, the subject matter of Example 21 includes, receiving a user input identifying a number of checks of the plurality of checks; determining that a number of captured checks in the first video or the second video does not match the number of checks of the plurality of checks; and outputting a notification to the user device based on the determination, the notification requesting the first video or the second video be recaptured.

In Example 23, the subject matter of Examples 21-22 includes, wherein the first side is a front side of the plurality of checks and the second side is a back side of the plurality of checks.

In Example 24, the subject matter of Examples 21-23 includes, providing instructions on a user interface, while capturing the first or second video, the instructions including an alert to move the user device in a particular direction.

In Example 25, the subject matter of Example 24 includes, determining that a number of checks captured in the first video or the second video does not match the number of checks of the plurality of checks; and outputting a notification to the user device based on the determination, the notification requesting that at least one of the first video or the second video be recaptured.

In Example 26, the subject matter of Examples 21-25 includes, determining that a number of the first set of respective individual images does not match a number of the second set of respective individual images; and outputting a notification to the user device based on the determination, the notification requesting that the first or second video be recaptured.

In Example 27, the subject matter of Examples 21-26 includes, converting the pairs of images to a set of Tag Image File Format (TIFF) files; and outputting, via an application programming interface (API), the set of TIFF files to a check depository.

In Example 28, the subject matter of Examples 21-27 includes, wherein comparing the geometrical features of the first side of each of the plurality of checks as represented in the first set of respective individual images to the geometrical features of the second side of each of the plurality of checks as represented in the second set of respective individual images includes comparing at least one of: a size of a check; a unique characteristic of a check including at least one of: a fold, a tear, a stain, a mark, or a crease; an orientation of a check determined from a MICR line; or an orientation of a check determined from text orientation.

In Example 29, the subject matter of Examples 21-28 includes, determining, after capturing the first video or the second video, that one or more checks of the plurality of checks are overlapping; and outputting a notification to the user device based on the determination, the notification requesting that the first video or the second video be recaptured.

In Example 30, the subject matter of Examples 21-29 includes, wherein determining that the first side of each check captured in the first video satisfies the quality metric includes determining that a quality score for a first side of a first check of the plurality of checks in a frame of the first video exceeds a quality score threshold.

In Example 31, the subject matter of Examples 21-30 includes, determining that a side of a check captured in a third video fails to satisfy the quality metric; and in response, outputting a notification to the user device based on the determination, the notification requesting that the third video be recaptured.

In Example 32, the subject matter of Examples 21-31 includes, determining that one or more images in the first set of respective individual images or in the second set of respective individual images are blurry; and outputting a notification to the user device based on the determination, the notification requesting that the first video or the second video be recaptured.

Example 33 is at least one non-transitory machine readable medium including instructions, which when executed by processing circuitry of a user device, cause the processing circuitry to perform operations to: capture a first series of images of a first side of each of a plurality of checks; determine that the first side of each check captured in the first series of images satisfies a quality metric; output a notification to the user device based on the determination, the notification requesting each of the plurality of checks be flipped to a second side; capture a second series of images of the second side of each of the plurality of checks; determine that the second series of images of the second side of each of the plurality of checks satisfies the quality metric; extract a first set of respective individual images of the first side of each check of the plurality of checks from the first series of images; extract a second set of respective individual images of the second side of each check of the plurality of checks from the second series of images; compare geometrical features of the first side of each of the plurality of checks as represented in the first set of respective individual images to geometrical features of the second side of each of the plurality of checks as represented in the second set of respective individual images; based on the comparison, select an image from the first set of respective individual images that corresponds to an image from the second set of respective individual images to form a pair of images, the pair of images representing a single check of the plurality of checks; and output, from the user device, the pair of images.

In Example 34, the subject matter of Example 33 includes, wherein the instructions further cause the processing circuitry to perform operations to: receive a user input identifying a number of checks of the plurality of checks; determine that a number of captured checks in the first series of images or the second series of images does not match the number of checks of the plurality of checks; and output a notification to the user device based on the determination, the notification requesting the first video or the second video be recaptured.

In Example 35, the subject matter of Examples 33-34 includes, wherein the instructions further cause the processing circuitry to perform operations to: provide instructions on a user interface, while capturing the first or second series of images, the instructions including an alert to move the user device in a particular direction.

In Example 36, the subject matter of Examples 33-35 includes, wherein the instructions further cause the processing circuitry to perform operations to: determine that a number of the first set of respective individual images does not match a number of the second set of respective individual images; and output a notification to the user device based on the determination, the notification requesting that the first or second series of images be recaptured.

In Example 37, the subject matter of Examples 33-36 includes, wherein the instructions further cause the processing circuitry to perform operations to: convert the pairs of images to a set of Tag Image File Format (TIFF) files; and output, via an application programming interface (API), the set of TIFF files to a check depository.

Example 38 is at least one non-transitory machine readable medium including instructions, which when executed by processing circuitry of a user device, cause the processing circuitry to perform operations to: capture a first video of a first side of each of a plurality of checks; determine that the first side of each check captured in the first video satisfies a first quality metric; output a notification to the user device based on the determination, the notification requesting each of the plurality of checks be flipped to a second side; capture a second video of a second side of each of the plurality of checks; determine that the second video of the second side of each the plurality of checks satisfies a second quality metric; extract a first set of respective individual images of the first side of each check of the plurality of checks from the first video; extract a second set of respective individual images of the second side of each check of the plurality of checks from the second video; compare geometrical features of the first side of each of the plurality of checks as represented in the first set of respective individual images to geometrical features of the second side of each of the plurality of checks as represented in the second set of respective individual images; based on the comparison, select an image from the first set of respective individual images that corresponds to an image from the second set of respective individual images to form a pair of images, the pair of images representing a single check of the plurality of checks; and output, from the user device, the pair of images.

In Example 39, the subject matter of Example 38 includes, wherein the first quality metric applies to a front of a check and the second quality metric applies to a back of a check.

In Example 40, the subject matter of Examples 38-39 includes, wherein the first side is a front side of the plurality of checks and the second side is a back side of the plurality of checks.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
   scanning a first side of a plurality of checks;
   extracting a first set of respective individual images of the first side of each check of the plurality of checks;
   determining that the first set of respective individual images of the first side each satisfy a quality metric;
   outputting a notification based on the determination, the notification requesting each of the plurality of checks be flipped to a second side;
   scanning the second side of the plurality of checks;
   extracting a second set of respective individual images of the second side of each check of the plurality of checks;
   comparing, using processing circuitry of a user device, geometrical features of the first side of each check of the plurality of checks as represented in the first set of respective individual images to geometrical features of the second side of each check of the plurality of checks as represented in the second set of respective individual images, the geometrical features including at least one of a size of a check, a fold, a tear, a stain, or a crease;
   based on the comparison, selecting, for each image from the first set of respective individual images, a corresponding image from the second set of respective individual images to form a plurality of pairs of images, each pair of images of the plurality of pairs of images representing a single check of the plurality of checks; and
   outputting, from the user device, the plurality of pairs of images.

2. The method of claim 1, further comprising determining that the second set of respective individual images of the second side of each check of the plurality of checks satisfies the quality metric before comparing the geometrical features.

3. The method of claim 1, further comprising:
   receiving a user input identifying a number of checks of the plurality of checks;
   determining that a number of captured checks in the first set of respective individual images of the first side or the second set of respective individual images of the second side does not match the identified number of checks; and
   outputting a notification to the user device based on the determination, the notification requesting that the first side or the second side of at least one check be rescanned.

4. The method of claim 1, wherein the first side is a front side of the plurality of checks and the second side is a back side of the plurality of checks.

5. The method of claim 1, further comprising:

determining that a number of captured checks in the first set of respective individual images of the first side does not match a number of captured checks in the second set of respective individual images of the second side; and outputting a notification to the user device based on the determination, the notification requesting at least one of the first set of respective individual images or at least one of the second set of respective individual images be rescanned.

6. The method of claim 1, further comprising:
converting the pairs of images to a set of Tag Image File Format (TIFF) files; and
outputting, via an application programming interface (API), the set of TIFF files to a check depository.

7. The method of claim 1, wherein comparing geometrical features of the first side of each check of the plurality of checks as represented in the first set of respective individual images to the geometrical features of the second side of each check of the plurality of checks as represented in the second set of respective individual images includes further comparing at least one of:
an orientation of a check determined from a magnetic ink character recognition (MICR) line; or
an orientation of a check determined from text orientation.

8. The method of claim 1, further comprising:
determining, after scanning the first side or the second side of the plurality of checks that one or more checks, on the first side or the second side, of the plurality of checks are overlapping; and
outputting a notification to the user device based on the determination, the notification requesting that the first side or the second side of the one or more checks be rescanned.

9. The method of claim 1, wherein determining that the first side of each check extracted in the first set of respective individual images satisfies the quality metric includes determining that a quality score for the first side of each check extracted in the first set of respective individual images exceeds a quality score threshold.

10. The method of claim 1, further comprising:
determining that a side of a check captured in a third scanned image does not satisfy the quality metric; and
in response, outputting a notification to the user device based on the determination, the notification requesting that the side of the check captured in the third scanned image be rescanned.

11. The method of claim 1, wherein the geometrical features further include a perforation.

12. At least one non-transitory machine readable medium including instructions, which when executed by processing circuitry of a user device, cause the processing circuitry to perform operations to:
scan a first side of a plurality of checks;
extract a first set of respective individual images of the first side of each check of the plurality of checks;
determine that the first set of respective individual images of the first side each satisfy a quality metric;
output a notification to the user device based on the determination, the notification requesting each of the plurality of checks be flipped to a second side;
scan the second side of the plurality of checks;
extract a second set of respective individual images of the second side of each check of the plurality of checks;
compare geometrical features of the first side of each check of the plurality of checks as represented in the first set of respective individual images to geometrical features of the second side of each check of the plurality of checks as represented in the second set of respective individual images, the geometrical features including at least one of a size of a check, a fold, a tear, a stain, or a crease;
based on the comparison, select, for each image from the first set of respective individual images, a corresponding image from the second set of respective individual images to form a plurality of pairs of images, each pair of images of the plurality of pair of images representing a single check of the plurality of checks; and
output the plurality of pairs of images.

13. The at least one non-transitory machine readable medium of claim 12, wherein the instructions further cause the processing circuitry to perform operations to determine that the second set of respective individual images of the second side of each check of the plurality of checks satisfies the quality metric before comparing the geometrical features.

14. The at least one non-transitory machine readable medium of claim 12, wherein the instructions further cause the processing circuitry to perform operations to:
receive a user input identifying a number of checks of the plurality of checks;
determine that a number of captured checks in the first set of respective individual images of the first side or the second set of respective individual images of the second side does not match the identified number of checks; and
output a notification to the user device based on the determination, the notification requesting that the first side or the second side of at least one check be rescanned.

15. The at least one non-transitory machine readable medium of claim 12, wherein the first side is a front side of the plurality of checks and the second side is a back side of the plurality of checks.

16. The at least one non-transitory machine readable medium of claim 12, wherein the instructions further cause the processing circuitry to perform operations to:
determine that a number of captured checks in the first set of respective individual images of the first side does not match a number of captured checks in the second set of respective individual images of the second side; and
output a notification to the user device based on the determination, the notification requesting at least one of the first set of respective individual images or at least one of the second set of respective individual images be rescanned.

17. The at least one non-transitory machine readable medium of claim 12, wherein the instructions further cause the processing circuitry to perform operations to:
convert the pairs of images to a set of Tag Image File Format (TIFF) files; and
output, via an application programming interface (API), the set of TIFF files to a check depository.

18. The at least one non-transitory machine readable medium of claim 12, wherein to compare the geometrical features of the first side of each check of the plurality of checks as represented in the first set of respective individual images to the geometrical features of the second side of each check of the plurality of checks as represented in the second set of respective individual images, the instructions further cause the processing circuitry to perform operations to further compare at least one of:

an orientation of a check determined from a magnetic ink character recognition (MICR) line; or an orientation of a check determined from text orientation.

19. The at least one non-transitory machine readable medium of claim 12, wherein the instructions further cause the processing circuitry to perform operations to:

determine, after scanning the first side or the second side of the plurality of checks that one or more checks, on the first side or the second side, of the plurality of checks are overlapping; and output a notification to the user device based on the determination, the notification requesting that the first side or the second side of the one or more checks be rescanned.

20. The at least one non-transitory machine readable medium of claim 12, wherein to determine that the first side of each check extracted in the first set of respective individual images satisfies the quality metric the instructions further cause the processing circuitry to perform operations to determine that a quality score for the first side of each check extracted in the first set of respective individual images exceeds a quality score threshold.

21. The at least one non-transitory machine readable medium of claim 12, wherein the instructions further cause the processing circuitry to perform operations to:

determining that a side of a check captured in a third scanned image does not satisfy the quality metric; and in response, outputting a notification to the user device based on the determination, the notification requesting that the side of the check captured in the third scanned image be rescanned.

22. The at least one non-transitory machine readable medium of claim 12, wherein the geometrical features further include a perforation.

\* \* \* \* \*